Sept. 28, 1948.　　　　　C. L. KNOTT　　　　　2,450,048
AUTOMATIC MANUALLY CONTROLLED CLUTCH
Filed April 27, 1946　　　　　　　　　　　　　　2 Sheets-Sheet 1
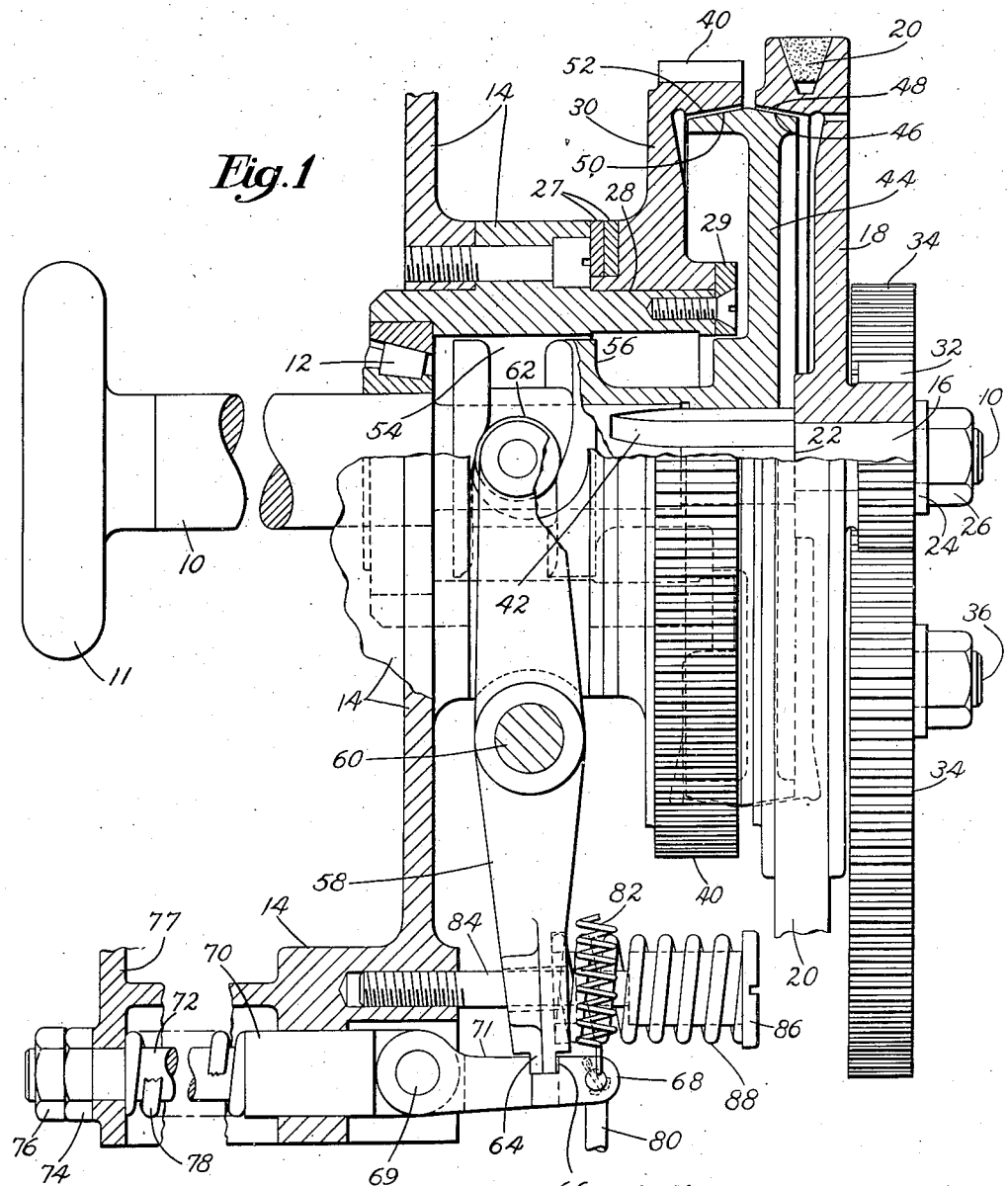
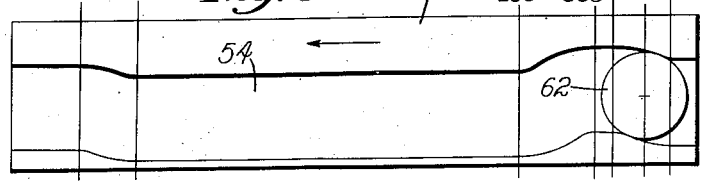
Inventor
Clyde L. Knott
By his Attorney Sept. 28, 1948.     C. L. KNOTT     2,450,048
AUTOMATIC MANUALLY CONTROLLED CLUTCH
Filed April 27, 1946     2 Sheets-Sheet 2

Inventor
Clyde L. Knott
By his Attorney

Patented Sept. 28, 1948

2,450,048

UNITED STATES PATENT OFFICE 2,450,048

AUTOMATIC MANUALLY CONTROLLED CLUTCH

Clyde L. Knott, Beverly, Mass., assignor to United Shoe Machinery Corporation, Flemington, N. J., a corporation of New Jersey Application April 27, 1946, Serial No. 665,455

5 Claims. (Cl. 192—33)

This invention relates to automatic manually controlled clutches and is herein disclosed as embodied in a treadle-operated friction clutch of a type adapted to drive an operating mechanism continuously through any number of cycles while the treadle is depressed and to bring the mechanism to rest at a predetermined point of the cycle when the treadle is released. Clutches of this type are used in sewing machines wherein the needle is always brought to rest at the completion of its up stroke. They may also be used in punching machines or in the eyeletting machine disclosed in my application for United States Letters Patent Serial No. 568,947, filed December 20, 1944, now Patent Number 2,443,682 patented June 22, 1948 wherein the various parts are brought to rest at a predetermined point of the cycle.

It is an object of the present invention to provide an improved clutch of this type and, moreover, a clutch which may also be operated by the turning of a hand wheel, without using the treadle, to drive a machine through a single cycle and then bring it to rest at a predetermined point.

The clutch illustrated herein comprises a driven clutch member slidably keyed upon a shaft and movable axially along the shaft in one direction to engage a high-speed driving clutch member and in the opposite direction to engage a low-speed driving clutch member. In accordance with a feature of the invention, the driven clutch member has formed in its hub a cam groove which is engaged by an operator-controlled mechanism for moving the cam to shift the driven clutch member from a neutral position into engagement with the high-speed driving clutch member, the cam and the operator-controlled mechanism being constructed and arranged also to stop the drive by moving the driven clutch member out of engagement with the high-speed driving clutch member and then into engagement with the low-speed driving clutch member, and finally into neutral position. As shown herein, the control mechanism consists of a cam roll engaging the cam groove and carried by a lever which is normally latched in a stationary position. The drive is started by depressing a treadle to trip the latch, thereupon releasing the lever to the action of a spring which urges it in a direction to cause the cam roll to move the cam and the driven clutch member into a position wherein the driven clutch member is in driving engagement with the high-speed driving clutch member. The lever, now released from the latch, will oscillate idly while the spring, operating through the lever, holds the driven clutch member engaged. The drive is stopped by releasing the treadle and thereby allowing the latch to re-engage the lever and hold it stationary. The cam is so designed as to cause the driven clutch member, when the free oscillation of the cam roll is thus stopped, to move out of engagement with the high-speed driving clutch member and into engagement with the low-speed driving clutch member, which at once exerts a braking action upon the driven clutch member to slow it down to its own speed and thereafter to continue driving the low-speed clutch member until the cam, by reason of its design, shifts the driven clutch member out of engagement with the low-speed driving clutch member into a neutral position. The low-speed driving clutch member is driven so slowly that as soon as the driven clutch member is released from it the machine, notwithstanding the inertia of its various operating parts, will come to rest almost instantaneously.

It is evident that with such an organization the operator can cause the machine to operate continuously through a plurality of cycles merely by holding the treadle down. However, he may sometimes wish to cause the machine to operate through a single cycle and then stop without danger of repeating. This may be accomplished merely by turning a hand wheel on the shaft inasmuch as the cam is so designed as to cause the driven clutch member, upon the turning of the shaft through the initial portion of a cycle, to engage the high-speed driving clutch member and thus to impart a high-speed power impulse to the operating instrumentalities. Continued rotation of the cam will bring the driven clutch member out of engagement with the high-speed driving clutch member and into engagement with the low-speed driving clutch member and then into neutral position. Inasmuch as the lever has not been released from the latch during this operation, there can be no possibility of the cycle being repeated. In thus causing the machine to perform a single cycle the operator can position a workpiece accurately in relation to the operating instrumentalities of the machine, for, in turning the main shaft through the initial portion of its cycle, he is bringing the tool which is to perform the operation toward the workpiece. By slowly turning the hand wheel, he can bring the tool close enough to the workpiece to enable him to gage the position of the workpiece accurately by eye before the high-speed clutch member is engaged to drive the tool through its power stroke.

These and other features of the invention, comprising certain combinations and arrangements of parts, will be apparent from the following description of a preferred embodiment of the invention, shown in the drawings, in which Fig. 1 is a front elevation, partly in section, of a preferred embodiment of the improved clutch;

Fig. 3 is a diagram of the controlling cam.

Figure 2:
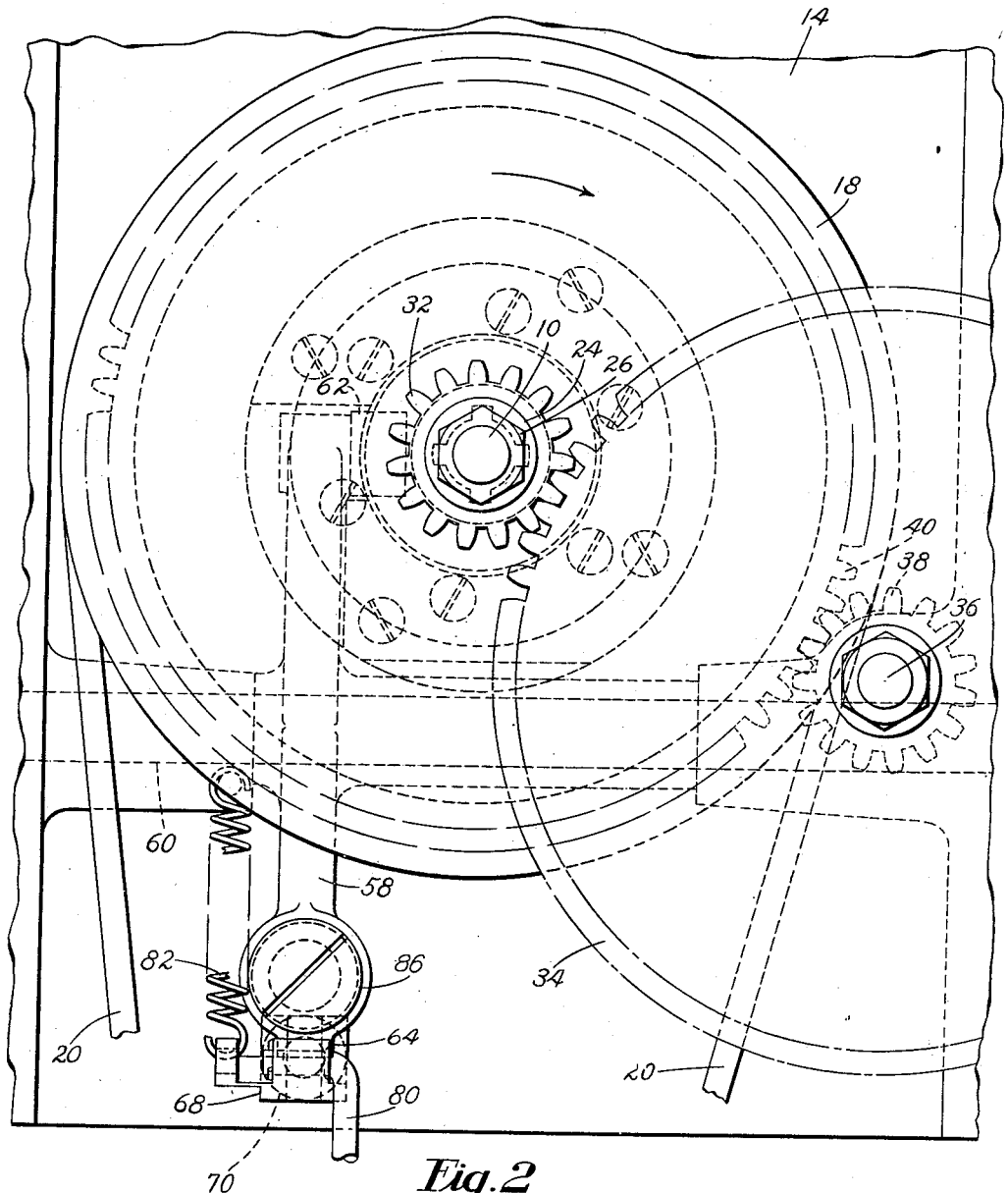
Fig. 2 is an end elevation of the clutch shown in Fig. 1.

The illustrated clutch is adapted to drive a shaft 10 which, in turn, drives the operating instrumentalities of a machine not shown herein, for example, a machine of the type disclosed in application Serial No. 568,947 above referred to. The shaft 10 carries a hand wheel 11 and is journaled in suitable bearings, one of which is indicated by the reference numeral 12, mounted in a stationary frame 14 and adapted to hold the shaft against axial movement. Freely rotatable upon a reduced end portion 16 of the shaft 10 is a driving clutch member 18 having its periphery grooved in the form of a pulley to engage a belt 20 by which the clutch member 18 may be driven at relatively high speed from any suitable source of power. The high speed clutch member 18 is restrained against axial movement in one directon by a shoulder 22 on the shaft 10, and in the other direction by a washer 24 backed by a nut 26 threaded upon the end portion of the shaft 10. Journaled upon an annular bearing portion 28 of the frame 14 and held against axial movement by thrust washers 27 and a retaining washer 29 is a driving clutch member 30 coaxial with the shaft 10 and the clutch member 18. The clutch member 30 is driven at relatively low speed through a train of gearing comprising a pinion 32 secured on the high-speed clutch member 18, a gear 34 meshing with the pinion 32 and secured upon a shaft 36 journaled in the machine frame 14, a pinion 38 secured upon the shaft 36, and a gear 40 formed on the periphery of the low-speed clutch member 30 and meshing with the pinion 38. The reduction in speed effected by the above-described train of gearing is sufficient to enable the shaft 10 and the operating instrumentalities associated therewith to stop substantially instantaneously when uncoupled from the clutch member 30. Mounted for axial sliding movement upon the shaft 10 and held against rotation with respect thereto by a key 42 is an intermediate or driven clutch member 44.

The periphery of the driven clutch member 44 has a frustro-conical surface 46 which is frictionally engageable with a complemental internal frustro-conical surface 48 formed on the high-speed clutch member 18. A second frustro-conical surface 50 on the periphery of the driven clutch member 44 is engageable with a complemental internal frustro-conical surface 52 formed on the low-speed clutch member 30. The driven clutch member 44 may be moved axially to bring its clutch surface 46 into engagement with the clutch surface 48 of the high-speed clutch member or to bring its clutch surface 50 into engagement with the clutch surface 52 of the low-speed member, or it may, as shown in Fig. 1, be maintained in a neutral position wherein no drive is transmitted to the shaft 10.

The engagement of the intermediate or driven clutch member 44 is controlled by a cylindrical cam, in the form of a cam groove 54 formed in a hub portion 56 of the clutch member 44, and a lever 58 fulcrumed upon a stationary pin 60 secured in the frame 14. The cam is shown developed, or diagrammatically, in Fig. 3. Mounted for free rotation in the upper end of the lever 58 is a roll 62 which engages the walls of the groove 54 and thus serves as a cam follower. The lower arm of the lever 58 carries a lug 64 which engages a notch 66 formed in a latch 68 pivotally mounted upon a pin 69 for heightwise swinging movement in a block 70. The upper edge of the latch 68 adjacent to the notch 66 is finished to provide a smooth bearing surface 71. A horizontal guideway formed in a portion of the frame 14 enables the block 70 to be moved toward the right or left, as shown in Fig. 1. Movement toward the right is limited by a rod 72 extending from the block 70 toward the left and having threaded upon its left-hand end a stop nut 74 backed by a lock nut 76. The rod 72 passes through an opening in a vertical wall 77 of the frame 14 and the stop nut 74, which may be turned to adjust the stop position of the block 70, engages a finished surface on the outside of the wall 77. The block 70 is yieldingly held in its stop position by a helical spring 78 surrounding the rod and interposed between the block 70 and the inner surface of the wall. Pivotally connected to the free end of the latch 68 is the upper end of a treadle rod 80 the lower end of which is connected to the usual treadle (not shown). A helical tension spring 82 also connected to the outer end of the latch 68 yieldingly holds the latch up in its normal position of engagement with the lug 64. Adjustably threaded into a suitable opening in the frame 14 is a horizontal pin 84 which passes through a clearance hole in the lower arm of the lever 58 and which has a head 86 formed upon its right-hand end. A helical compression spring 88, which is weaker than the spring 78, is interposed between the head 86 and a surface of the lower arm of the lever 58 to urge the lower arm toward the left as seen in Fig. 1.

Fig. 1 shows the clutch in its neutral or initial position, in which an assumed 0° line (Fig. 3) on the clutch passes through the axis of the roll 62.

The operation of the above-described clutch will now be explained. Suppose, for example, a row of eyelets is to be set in a shoe upper by means of a machine of the type disclosed in application Serial No. 568,947 above referred to, the operator steps upon the treadle, depressing the rod 80 and releasing the lug 64 from the latch 68. The spring 88 thereupon swings the lever 58 in a clockwise direction about its fulcrum pin 60 and, through the pressure of the cam roll 62 against the right-hand wall of the cam groove 54, urges the driven clutch member 44 into engagement with the high-speed driving clutch member 18. The shaft 10 is thereupon driven at high speed and a plurality of eyelet holes are punched and the eyelets are set in these holes in rapid succession. During this operation of the machine the lever 58, under control of the spring 88, oscillates idly as the cam groove 54 turns. The period of vibration of the spring is less than the period of oscillation of the lever, and the spring, therefore, can expand fast enough to follow up the lever and exert a thrust upon it during each receding movement of the lever. The operator stops the drive of the machine by releasing the treadle, whereupon the latch 68 rises until the finished surface 71 engages the under surface of the lug 64. The lug 64, in the course of its oscillatory movement, will then engage the notch 66 and hold the lever 58 against oscillation. The cam groove 54 is so designed that when the lever 58 thus becomes latched in its stationary position the reaction of the rotating cam upon the roll 62 will move the driven clutch member 44 to the left out of engagement with the high-speed driving member 18 and into engagement with the low-speed driving member 30. This shift from high to low speed is effected by that portion of the cam beginning at the 295° line on Fig. 3 and ending on the 335° line. The spring 78 yields during this shift to limit the pressure developed between the engaging clutch members. The driven clutch member 44, still rotating at high speed because of its inertia, will be slowed down by the braking action of the low-speed clutch member 30 until it rotates in unison therewith. The low speed portion of the cam is provided with a slight dwell, from 335° to 345° to allow time for the braking action to be completed. Continued rotation of the driving clutch member 30 from the 345° line to the 0° line will cause the cam to move the driven clutch member 44 to the right out of engagement with the driving clutch member 30 but not far enough to engage the high-speed driving member 18. As soon as the driven clutch member is thus brought into its neutral position, the shaft 10 and its associated operating mechanism will stop almost instantaneously. This sudden stopping results partly from the fact that the shaft 10 was turning slowly at the time of disengagement of the driven clutch member 44 from the low-speed driving clutch member 30, and partly from the fact that a considerable amount of the kinetic energy of the moving parts of the machine is used up in the effort of effecting the disengagement.

It sometimes happens that in the course of laying a row of eyelets the eyelet feeding mechanism may fail to deliver an eyelet to be set in one of the holes. In such case, it becomes necessary for the operator, after completing the row, to position the workpiece in the machine accurately in relation to the setting dies and cause the machine to operate through a single cycle to set the eyelet. This can be accomplished, through the use of the above-described clutch, by turning the hand wheel 11 without depressing the treadle. As the hand wheel 11 is turned, the operating instrumentalities of the machine move through the initial part of a cycle and the slow descent of the upper eyelet setting die enables the operator to position the already formed hole in the work piece accurately with respect to it. During the first portion of this movement, the cam in turning from 0° to 15° causes the driven clutch member 44 to back away slightly further from the low speed driving member 30 until it is about half way between the two driving clutch members. During the remaining portion of this movement, from 15° to 65°, a dwell of the cam continues to hold the driven clutch member out of engagement with the driving clutch members. At this point the operator is ready to engage the driven clutch member with the high speed driving clutch member, and such engagement takes place as the cam moves from 65° to 95°. The shaft 10 is thereupon driven rapidly, through that portion of the cycle which begins at 95°, to 295°. The speed of the drive at this portion of the cycle is sufficient to overcome rapidly the inertia of the various parts of the machine and to develop all the force necessary for a single power stroke to set the eyelet. Continued rotation of the driven clutch member 44 will now operate as before to disengage it from the high-speed driving clutch member 18 and to engage it with the low-speed driving clutch member 30, and then, when the shaft is slowed down to the speed of the clutch member 30, to bring the driven clutch member 44 into its neutral position, whereupon the machine will stop. Inasmuch as the treadle has not been depressed to release the lever 58, there can be no danger of the operation repeating.

Having described my invention, what I claim as new and desire to secure by Letters Patent of the United States is:

1. A clutch comprising a shaft a pair of rotary driving clutch members coaxial with the shaft, means for driving one of said clutch members at high speed and the other at low speed, a driven clutch member keyed upon said shaft between the driving clutch members, a cam on said driven clutch member, and an operator-controlled mechanism for moving said cam to shift the driven clutch member from a neutral position into engagement with said high-speed driving clutch member, said cam and said operator-controlled mechanism being constructed and arranged also to stop the drive by moving the driven clutch member out of engagement with the high-speed driving clutch member and then into engagement with the low-speed driving clutch member and finally into neutral position.

2. A clutch comprising a shaft, a pair of rotary driving clutch members coaxial with the shaft, means for driving one of said clutch members at high speed and the other at low speed, a driven clutch member keyed upon said shaft between the driving clutch members, a cam on the driven clutch member, a roll engaging said cam, resilient means for urging said roll longitudinally of the shaft to cause the cam to move the driven clutch member into engagement with the high-speed driving clutch member, whereupon the shaft is driven at high speed, and operator-controlled means for holding said cam roll against longitudinal movement or for releasing it to the action of said resilient means at will, said cam being designed normally, when the cam roll is held against longitudinal movement, to hold the driven clutch member in a neutral position out of engagement with the driving members, and also being designed, when movement of the cam roll is stopped by the operator-controlled means during the drive of the shaft at high speed, to move the driven clutch member first out of engagement with the high-speed member, then into engagement with the low-speed member, and then into neutral position.

3. A clutch comprising a shaft, a pair of rotary driving friction clutch members coaxial with the shaft, means for driving one of said clutch members at high speed and the other at low speed, a driven friction clutch member keyed upon said shaft between the driving clutch members, a hub on said driven clutch member having a cam groove formed in its periphery, a roll engaging said cam groove, a lever on which said cam roll is mounted, a spring engaging the lever and exerting a force against the lever which tends to move the cam roll and therefore the hub and the driven clutch member in a direction to engage the driven clutch member with the high-speed driving clutch member, a latch normally engaging said lever to hold the lever against the force of said spring in a neutral position wherein the driven clutch member is out of engagement with both driving clutch members, and treadle-operated means for disengaging said latch to release said lever to the action of said spring, thereby causing the shaft to be driven at high speed for any desired period, and for re-engaging the latch with the lever to stop the drive of the shaft, said cam groove being designed to shift the driven clutch member, when the latch is re-engaged, first away from the high-speed driving clutch member and into engagement with the low-speed driving member, and then into neutral position.

4. A clutch comprising a shaft, a pair of rotary driving clutch members coaxial with the shaft, means for driving one of said clutch members at high speed and the other at low speed, a driven clutch member slidably keyed upon said shaft between the driving clutch members, a cam on said driven clutch member, a cam follower engageable with said cam, means normally holding said cam follower stationary and thereby causing the cam to control the position of the driven clutch member with respect to the driving clutch members, and a hand wheel for turning said shaft through the initial portion of a cycle, said cam being designed, when the shaft is turned and the cam follower is held stationary, to move the driven clutch member from a neutral position between the driving clutch members into driving engagement with the high-speed driving clutch member, whereupon the high-speed driving clutch member will drive the driven clutch member through a succeeding portion of the cycle, said cycle being determined by the design of the cam and said design being such as to cause the driven clutch member to move out of engagement with the high-speed driving clutch member and into engagement with the low-speed driving clutch member and then into said neutral position with the driven clutch member out of engagement with both driving clutch members at the end of the cycle.

5. A clutch comprising a shaft, a hand wheel by which the operator can turn the shaft, a pair of rotary driving clutch members coaxial with the shaft, means for driving one of said clutch members at high speed and the other at low speed, a driven clutch member slidably keyed upon said shaft between the driving clutch members, a cam on said driven clutch member, a cam follower engaging said cam, and a treadle-operated control mechanism adapted normally to hold said cam follower stationary, said cam being designed, when the shaft is turned and the cam follower is stationary, to engage the driven clutch member first with the high-speed driving member, then with the low-speed driving member, and then to disengage it from the low-speed driving member to permit the shaft to stop at the end of a single revolution, and said control mechanism being operable to release the cam follower and, through the cam follower, to engage the driven clutch member with the high-speed driving member to drive the shaft continuously at high speed for as long as desired, said control mechanism then being operable to re-engage the cam follower and hold it stationary, whereupon the cam will operate as before to engage the driven clutch member with the low-speed driving member, and then to disengage it from the low-speed driving member to permit the shaft to stop.

CLYDE L. KNOTT.

REFERENCES CITED

The following references are of record in the file of this patent:

UNITED STATES PATENTS

| Number | Name | Date |
|---|---|---|
| 1,870,226 | Bishop | Aug. 9, 1932 |
| 2,379,901 | Hare | July 10, 1945 |
| 2,271,359 | Zeruneith | Jan. 27, 1942 |